Aug. 21, 1923.
H. A. SMITH ET AL
1,465,492
FRICTION CLUTCH
Filed Jan. 24, 1921     2 Sheets-Sheet 1
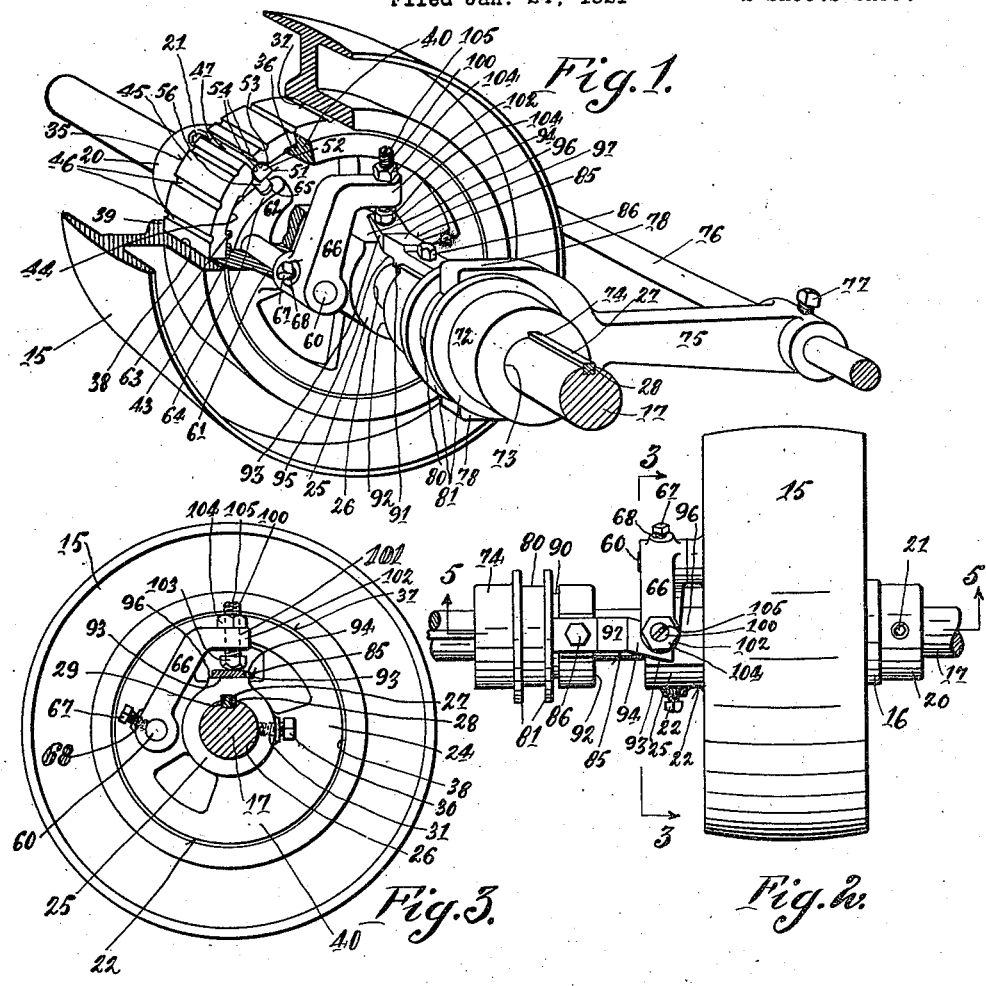
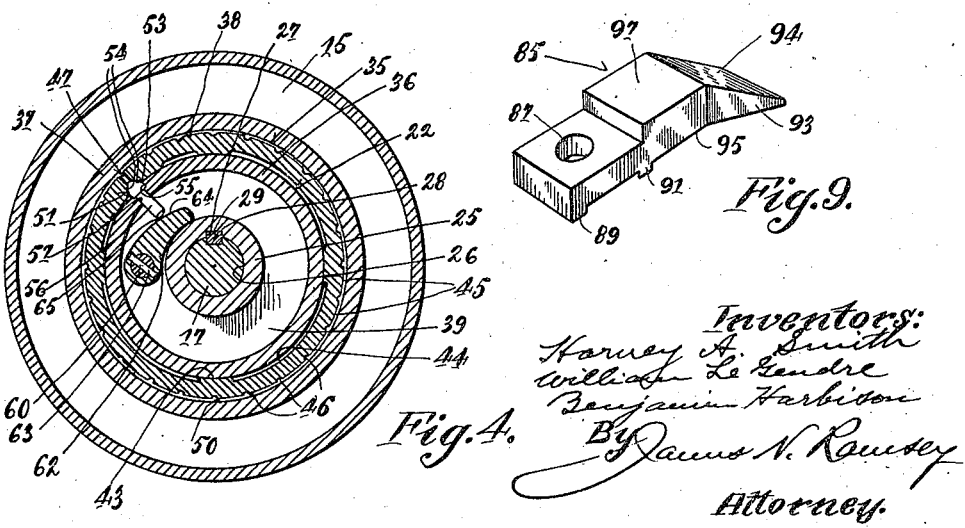
Inventors:
Harvey A. Smith
William Le Gendre
Benjamin Harbison
By James N. Ramsey
Attorney.

Aug. 21, 1923.
H. A. SMITH ET AL
1,465,492
FRICTION CLUTCH
Filed Jan. 24, 1921    2 Sheets-Sheet 2
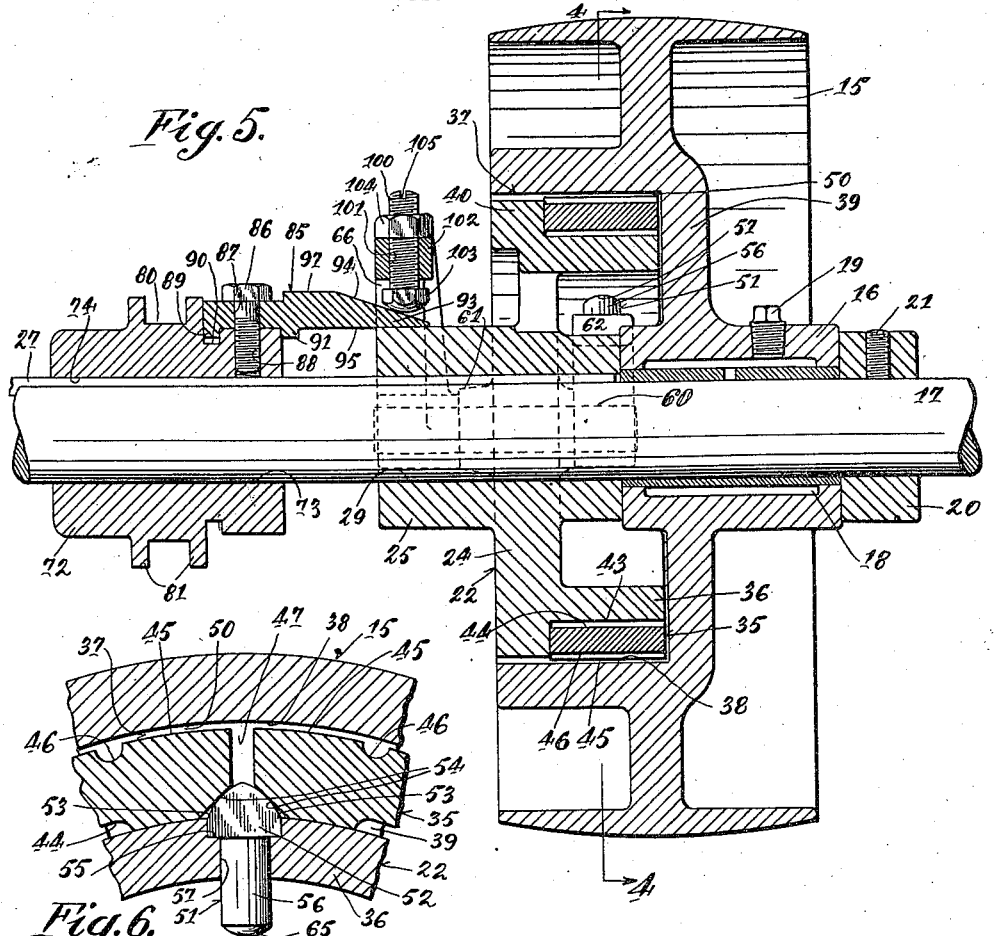
Fig. 5.
Fig. 6.
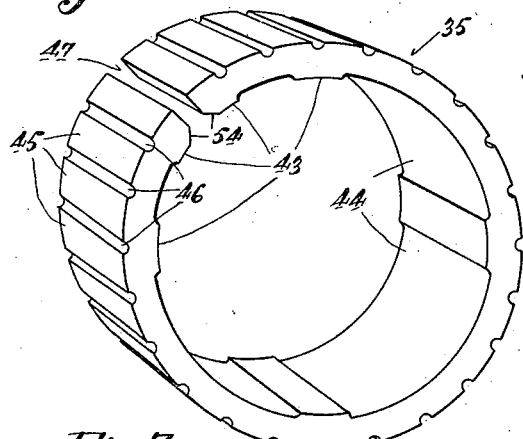
Fig. 7.
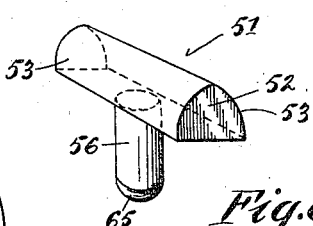
Fig. 8.
Inventors:
Harvey A. Smith
William Le Gendre
Benjamin Harbison
By James N. Ramsey
Attorney.

Patented Aug. 21, 1923.

1,465,492

UNITED STATES PATENT OFFICE.

HARVEY A. SMITH, WILLIAM LE GENDRE, AND BENJAMIN H. HARBISON, OF CINCINNATI, OHIO; SAID SMITH ASSIGNOR TO SAID LE GENDRE.

FRICTION CLUTCH.

Application filed January 24, 1921. Serial No. 439,592.

*To all whom it may concern:*

Be it known that we, HARVEY A. SMITH, WILLIAM LE GENDRE, and BENJAMIN H. HARBISON, citizens of the United States, residing at No. 858 Oliver St., No. 1122 Rosemont Ave., and 1610 Dudley St., respectively, in the county of Hamilton and State of Ohio, have invented certain new and useful Improvements in Friction Clutches, of which the following is a specification.

Our invention relates to friction clutches operating by the use of an expansible ring. Heretofore it has been the practice to employ split expansible rings machined on all surfaces. It is well known that certain metals, such as cast iron, steel, and semi-steel have a certain flexibility in their rough cast form without further treatment. The machining operation, however, removes the scale, and therefore the metal loses its resiliency. The inherent resiliency in the rough casting is due entirely to a thin layer of hard substance, on the outside of the casting termed the scale. The loss of resiliency in the expansible ring causes a clutch to continue to grip after the expanding element has been released, thus continuing to drive the machine and endanger the hands and fingers of the workman or spoil the work. This action tends to quickly wear out the friction ring and its mating element. As a result only a partial seizing takes place after the clutch has been in service for a short time, the friction surfaces becoming so roughened and cut as to prevent the clutch from performing its proper function entirely.

It is the object of our invention to provide a clutch of extremely strong and durable construction, and further to provide a split ring having all the advantages as relating to accuracy of a completely machined ring, and yet at the same time retain all the advantages of a rough casting with a scale thereon. Also to provide a friction ring that will have unusual gripping qualities, and at the same time retaining great resiliency, thus compelling the ring to pull away from the driving member by its own action when the spreading element is withdrawn.

Our invention consists in the mechanism and details of construction hereinafter described, claimed and illustrated in the drawings in which:

Fig. 1 is a perspective view of our invention, partly broken away to better illustrate its construction;

Fig. 2 is a plan view of our improved device;

Fig. 3 is a vertical cross section taken on a plane corresponding to the line 3—3 of Fig. 2;

Fig. 4 is a vertical cross section taken in a plane corresponding to the line 4—4 of Fig. 5;

Fig. 5 is a longitudinal vertical section taken in a plane corresponding to the line 5—5 of Fig. 2;

Fig. 6 is an enlarged cross section partly broken away, illustrating the method of spreading the friction ring, and taken in a plane corresponding to the line 4—4 of Fig. 5;

Fig. 7 is a perspective view of the friction ring;

Fig. 8 is a perspective view of the spreading member for spreading the friction ring;

Fig. 9 is a perspective view of the sliding wedge for operating the rockable arm.

Loose pulley 15 has a bearing 16 about a shaft 17. The bearing may be of the usual construction, employing an oil well 18 and the usual filling plug 19. A collar 20 on the shaft 17, and held in place by set screw 21, prevents end-wise movement of the loose pulley. The pulley is hereinafter referred to as the driving member.

A driven member 22 comprises a web 24 and a hub 25. The shaft 17 passes through a bore 26 in the hub 25. The driven member is secured against rotary movement on the shaft as by a key 27 secured in a keyseat 28 in the shaft. The key is adapted to co-act with the keyway 29 in the hub. The driven member is held against endwise movement by a set screw 30, received in a threaded hole 31 in the hub.

A resilient friction ring 35 is received about a hollow hub 36 integrally formed with the web 24. The friction ring and the hollow hub are received in a cylindrical bore 37 of the driving member, having internal friction contact surface 38. The web 39 of the driving member forms the end wall of the bore, effectively preventing the ingress of foreign matter into the clutch. The friction ring is held against endwise movement by the circular flange 40 formed on the driven member.

The friction ring is so formed as to retain the greatest portion of the scale on the internal surface of the ring, and also sufficient of the scale on the external surface of the ring to provide the required resiliency. Thus, 43 are machine finished pads on the inner surface 44 of the ring. The surface 44 is left rough just as it comes from the mold, thus retaining the scale. The external surface of the ring consists of friction pads 45 interrupted by rough scale grooves 46. To permit of expansion under pressure, the ring is split by a slot 47. When the ring is not in expanded relation, a space 50 is formed between the friction pads 45 and the internal friction surface 38 of the driving member.

For expanding the ring, I provide an expanding member 51, comprising a wedge 52, having rounded expanding surfaces 53 adapted to contact the angular surfaces 54 formed on the walls of the slot 47. The wedge 52 is received in a groove 55 on the hollow hub 36. A shank 56 integrally formed with the wedge 52 has movement endwise in a hole 57 in the hollow hub. A rock-shaft 60 is journaled in a bearing 61 in the web of the driven member, and has an operating arm 62 secured thereon by a pin 63. The operating arm has a contact surface 64 on the outer end thereof for contacting a rounded end 65 on the shank 56. A rockable arm 66 is adjustably secured on the other end of the rock shaft by a set screw 67 received in a threaded hole 68.

An endwise slidable hub 72, having a bore 73 therein, is mounted on the shaft adjacent the driven member.

The hub is held against rotary movement on the shaft by a keyway 74, co-acting with the key 27. A usual fork 75 secured to a usual shifter rod 76 by a set screw 77 has tangs 78 received in circular groove 80, formed by the flanges 81 on the endwise slidable hub. The usual type of shifter lever may be attached to the shifter rod and is not herein illustrated because well known. A wedge member 85 is secured to the endwise slidable hub by a bolt 86 passing through a hole 87 therein and threaded into a threaded hole 88 in the hub. The wedge member is more firmly secured to the hub as by having a rib 89 integrally formed therewith, received in a circular groove 90 in the hub, and a rib 91 integrally formed therewith adapted to be received against the end surface 92 of the slidable hub. This construction securely holds the wedge member against lateral movement.

The wedge member further has a laterally extending end portion 93, having an inclined surface 94 on the upper side thereof, and a plane bearing surface 95 on the under side thereof, adapted to co-act with a plane surface 96 on the hub 25. A flat horizontal surface 97 on the upper side of the wedge member meets the inclined surface 94. An adjusting screw 100 is threaded into a threaded hole 101 in the end 102 of the rockable arm, and has a rounded head 103 on one end thereof. A lock nut 104 securely locks the bolt 100 in place. A slot 105 in the other end of the adjusting screw forms a ready means for adjusting the same.

The rounded head on the adjusting screw co-acts with inclined surface 94 to actuate the rockable arm.

In the movement of the rockable arm, rounded head 103 of the adjusting screw follows a circular path, and therefore has a lateral movement in relation to the wedge member. The end portion 95 of the wedge member with the inclined surface thereon, therefore preferably extends in a lateral direction away from the rockable arm. The relative lateral movement between the head on the adjusting screw and the inclined surface is thus compensated for.

In operation, the shifter rod 76 is moved by the usual form of shifter handle (not shown), carrying with it the shifter fork 75, thus moving the endwise slidable hub 72 and the wedge member 85 toward the driven member 22. The movement of the wedge supported by the plane surface 96 on the hub 25, forces the rockable arm 66 outward through the medium of the rounded head 103, contacting the inclined surface 94. The rock shaft 60 is thus rocked, forcing the operating arm 62 with its contact surface 64 against the rounded end 65 of the shank 56 on the spreading member 51. The spreading surfaces 53 contact the angular surfaces 54 on the friction ring, forcing the ends outward and expanding the ring. Thus the friction pads 45 on the ring are forced into contact with the friction surface 38 of the driving member, with terrific pressure, forming a practically rigid unit of the driven and driving members. The friction ring is caused to rotate with the driven member by the wedge member 52 received in the groove 55 acting as a driving key. The rounded end 103 of the screw 100 in the rockable arm is so adjusted as to come to rest on the horizontal flat surface 97, thus preventing the unintentional disengagement of the clutch.

When the clutch is disengaged by pulling the wedge from under the rockable arm, the inherent spring tendencies in the resilient ring pull the friction pads 45 away from the friction surface 38 on the driving member and close it about the hub 36. This action brings the angular surfaces 54 toward each other, forcing the spreading member 51 downward, which in turn forces the operating arm and rockable arm on the rock-shaft toward the hub of the driven member.

It is obvious that by our improved construction absolutely no contact of the friction ring is had with the driving member, when the clutch is disengaged, thus avoiding all undue wear, and prolonging the life of the clutch. The resilient tendency of the ring to close holds it firmly about the hollow hub of the driven member, and prevents all rattle and noise.

What we claim as new and desire to secure by Letters Patent is:

1. In a friction clutch, a friction ring, the said friction ring being severed at a point on its circumference by a slot, machined friction pads on the outside of said ring, non-machined rough grooves between said pads, machined pads on the inner surface of said ring, and non-machined rough surfaces between said pads on the inner surface of said ring, whereby the natural resiliency is retained.

2. In a friction clutch, a shaft, a driving member journaled on said shaft, a driven member secured to said shaft, said driven member comprising a hub, a web on said hub, and a hollow hub on said web, a friction ring received about said hollow hub, said ring severed at one point by a slot, non-machined surfaces on said ring whereby it is caused to resiliently close about said hollow hub, machined surfaces interrupting said non-machined surfaces to form contact with said hollow hub, angular surfaces formed on walls of said slot, a spreading member having radial movements in said hollow hub, comprising a wedge adapted to co-act with said angular surfaces on said ring, a shank on said wedge, and a bearing for said shank in said hollow hub, and means for causing the radial movement of said spreading member.

3. In a friction clutch, a shaft, a driving member journaled on said shaft, a driven member secured on said shaft, a friction ring received between the said driving member and said driven member, machined surfaces on said friction ring, non-machined surfaces interrupting said machined surfaces, whereby some of said machined surfaces are normally caused to closely contact said driven member, a spreading member in said driven member for spreading said ring and causing frictional contact with said driving member, a bearing in said driven member, and means for causing the radial movement of said spreading member comprising, a rock shaft journaled in said bearing, an operating arm secured to one end of said shaft adapted to form mechanical connection with said spreading member, a rockable arm adjustably secured to the other end of said shaft, an adjusting screw in the outer end of said rockable arm, a rounded head on said screw, and a movable wedge member adapted to contact the said rounded head of said screw for causing the movement of the said rockable arm.

4. In a friction clutch, a driving member, a shaft on which said driving member is journaled, a driven member secured to said shaft, a key in said shaft to cause said driven member to rotate therewith, a friction ring received between said driving member and said driven member, spreading means for spreading said ring, actuating means for actuating said spreading means, a hub slidable endwise on said shaft, said hub having a keyway therein adapted to co-act with said key in said shaft for causing rotation therewith, a wedge member secured to said hub for causing the movement of said operating means, a bolt in said hub for securing said wedge member thereto, a groove in said hub, a rib on said wedge member adapted to enter said groove, an end surface on said hub, and a second rib on said wedge member adapted to contact said end surface for forming a rigid securing means therefor.

5. In a friction clutch, a driving pulley, a shaft on which said driving pulley is journaled, a driven member secured to said shaft, said driven member having a keyway therein, a hub endwise slidable on said shaft and having a keyway therein, a key in said shaft adapted to co-act with said keyway in said hub and said keyway in said driven member for preventing relative rotary movement therebetween, a friction ring for forming frictional driving connection between said driven member and said driving member, a plurality of machined surfaces on said friction ring, a plurality of non-machined surfaces interrupting said machined surfaces, means for spreading said friction ring to cause driving connection between said driven member and said driving member, actuating means for said spreading means, and an operating means secured to said hub for operating said actuating means.

6. In a friction clutch, a shaft, a loose pulley journaled on said shaft, said loose pulley having a cylindrical bore therein, a friction surface on said cylindrical bore, a driven member rotatable with said shaft, said driven member comprising a hub, having a keyway therein, a web formed on said hub, and a hollow hub formed on said web, a friction ring received about said hollow hub, a circular flange formed on one end of said hollow hub for holding said friction ring in place, said friction ring severed at one point by a slot, a spreading member for spreading said ring and comprising a wedge having spreading surfaces formed thereon adapted to co-act with the walls of said slot, a shank on said wedge, and a rounded end on said shank, a bearing in said hollow hub in which said shank has radial movement, a rock shaft suitably mounted, an operating arm secured on one end of said rock shaft adapted to contact said rounded end on said shank, a rockable arm adjustably secured to the other end of said rock shaft, an adjusting screw in the outer end of said rockable arm, a rounded head on said adjusting screw, an endwise slidable hub keyed on said shaft, a wedge member secured to said slidable hub, means for securing said wedge member thereto, a rib on said wedge member received in said groove, a plane surface on said driven member in substantial alignment with the bottom surface of said wedge member for forming a support therefor, a laterally projecting end portion formed on said wedge member, an inclined surface on said laterally projecting end portion for co-acting with said rounded head on said adjusting screw, and a horizontal plane surface on said wedge member adapted to receive said rounded head of said adjusting screw whereby said rockable arm is held in raised position.

HARVEY A. SMITH.
WILLIAM LE GENDRE.
BENJAMIN HARBISON.